United States Patent
Hanmann et al.

(10) Patent No.: US 7,725,584 B1
(45) Date of Patent: May 25, 2010

(54) USING MULTIPLE COMMUNICATION CHANNELS TO SYNCHRONIZE A MOBILE TERMINAL BASED ON DATA TYPE

(75) Inventors: Jonathan Lee Hanmann, Corona, CA (US); Anil Sareen, Mission Viejo, CA (US); Kenneth J. Smith, Corona, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 1129 days.

(21) Appl. No.: 11/265,752

(22) Filed: Nov. 2, 2005

Related U.S. Application Data

(62) Division of application No. 09/918,657, filed on Jul. 30, 2001, now abandoned.

(51) Int. Cl.
G06F 15/16 (2006.01)
H04J 3/06 (2006.01)

(52) U.S. Cl. .............. 709/227; 709/217; 370/350
(58) Field of Classification Search .......... None
See application file for complete search history.

(56) References Cited

U.S. PATENT DOCUMENTS

| | | | |
|---|---|---|---|
| 4,809,177 A * | 2/1989 | Windle et al. ............ | 701/1 |
| 4,928,177 A | 5/1990 | Martinez | |
| 5,572,643 A | 11/1996 | Judson | |
| 5,673,259 A | 9/1997 | Quick, Jr. | |
| 5,696,903 A | 12/1997 | Mahany | |
| 5,708,961 A * | 1/1998 | Hylton et al. ............ | 725/81 |
| 5,729,544 A * | 3/1998 | Lev et al. ............... | 370/352 |
| 5,809,242 A | 9/1998 | Shaw et al. | |
| 5,892,535 A | 4/1999 | Allen et al. | |
| 5,903,723 A | 5/1999 | Beck et al. | |
| 5,923,648 A | 7/1999 | Dutta | |
| 5,978,381 A | 11/1999 | Perlman et al. | |
| 5,982,535 A * | 11/1999 | Inoue et al. ............. | 359/394 |
| 5,987,480 A | 11/1999 | Donohue et al. | |
| 6,021,426 A | 2/2000 | Douglis et al. | |
| 6,029,045 A * | 2/2000 | Picco et al. ............. | 725/34 |
| 6,085,229 A | 7/2000 | Newman et al. | |
| 6,101,531 A | 8/2000 | Eggleston et al. | |
| 6,128,663 A | 10/2000 | Thomas | |

(Continued)

FOREIGN PATENT DOCUMENTS

WO   WO 01/35211 A2   5/2001

(Continued)

OTHER PUBLICATIONS

Office Action dated Dec. 15, 2004 from U.S. Appl. No. 09/918,657, 4 pages.

(Continued)

Primary Examiner—John B. Walsh

(57) ABSTRACT

The present invention may be regarded as a method of operating a mobile terminal during a synchronization session. A plurality of data types, including a first data type and a second data type, are identified to synchronize with the mobile terminal. A rule base is applied to assign the first data type to a first communication channel and the second data type to a second communication channel. Synchronization data of the first data type is exchanged over the first communication channel, and synchronization data of the second data type is exchanged over the second communication channel.

48 Claims, 6 Drawing Sheets

U.S. PATENT DOCUMENTS

| | | | |
|---|---|---|---|
| 6,138,156 | A | 10/2000 | Fletcher et al. |
| 6,138,158 | A | 10/2000 | Boyle et al. |
| 6,141,010 | A | 10/2000 | Hoyle |
| 6,157,946 | A | 12/2000 | Itakura et al. |
| 6,198,919 | B1 | 3/2001 | Buytaert et al. |
| 6,198,920 | B1 | 3/2001 | Doviak et al. |
| 6,216,173 | B1 | 4/2001 | Jones et al. |
| 6,247,135 | B1 | 6/2001 | Feague |
| 6,275,831 | B1 | 8/2001 | Bodnar et al. |
| 6,295,541 | B1 | 9/2001 | Bodnar et al. |
| 6,379,251 | B1 | 4/2002 | Auxier et al. |
| 6,442,169 | B1 * | 8/2002 | Lewis ......................... 370/401 |
| 6,477,543 | B1 | 11/2002 | Huang et al. |
| 6,526,350 | B2 | 2/2003 | Sekiyama |
| 6,549,917 | B1 * | 4/2003 | Pollard et al. ............... 707/201 |
| 6,646,979 | B1 | 11/2003 | Chen et al. |
| 6,647,257 | B2 | 11/2003 | Owensby |
| 6,647,269 | B2 | 11/2003 | Hendrey et al. |
| 6,687,737 | B2 | 2/2004 | Landsman et al. |
| 6,738,808 | B1 | 5/2004 | Zellner et al. |
| 6,795,554 | B2 * | 9/2004 | Farkas et al. ................ 380/33 |
| 6,826,614 | B1 | 11/2004 | Hanmann et al. |
| 6,839,741 | B1 | 1/2005 | Tsai |
| 6,850,740 | B1 | 2/2005 | Haartsen |
| 6,892,217 | B1 | 5/2005 | Hanmann et al. |
| 6,944,402 | B1 * | 9/2005 | Baker et al. .................. 398/128 |
| 6,954,641 | B2 * | 10/2005 | McKenna et al. ......... 455/435.1 |
| 6,965,926 | B1 | 11/2005 | Shapiro et al. |
| 6,993,358 | B2 * | 1/2006 | Shiotsu et al. ........... 455/552.1 |
| 7,024,491 | B1 | 4/2006 | Hanmann et al. |
| 7,035,932 | B1 * | 4/2006 | Dowling ..................... 709/230 |
| 7,248,861 | B2 * | 7/2007 | Lazaridis et al. ......... 455/414.1 |
| 2001/0054180 | A1 * | 12/2001 | Atkinson ..................... 725/32 |

FOREIGN PATENT DOCUMENTS

WO      WO 01/35211 A3      5/2001

OTHER PUBLICATIONS

Office Action dated Mar. 28, 2005 from U.S. Appl. No. 09/918,657, 12 pages.

Office Action dated Sep. 8, 2005 from U.S. Appl. No. 09/918,657, 11 pages.

\* cited by examiner

USING MULTIPLE COMMUNICATION CHANNELS TO SYNCHRONIZE A MOBILE TERMINAL BASED ON DATA TYPE

CROSS REFERENCE TO RELATED APPLICATIONS AND PATENTS

This application is a divisional of U.S. patent application Ser. No. 09/918,657, filed Jul. 30, 2001, which is incorporated herein by reference in its entirety.

BACKGROUND OF THE INVENTION

1. Field of the Invention

The present invention relates to mobile terminals. More particularly, the present invention relates to using multiple communication channels to synchronize a mobile terminal based on data type.

2. Description of the Prior Art

Mobile terminals, such as handheld computers, cellular telephones, tablet computers etc., are typically used to view and manipulate various databases, such as personal information management (PIM) data, emails, and web sites. The mobile terminal is typically synchronized when the databases are updated, for example, when the user modifies PIM data on a target computer or when the contents of a web site change. FIG. 1 illustrates a prior art technique for synchronizing a mobile terminal 2 over a local connection 6 (e.g., a USB connection) to databases stored on a target computer 4 as well as web pages stored on the Internet.

FIG. 2 illustrates various configurations for remotely synchronizing the mobile terminal 2 to the target computer 4 via the Internet 8. The mobile terminal may access the Internet 8 over telephone lines 14 using a modem communicating with an Internet service provider (ISP) 16. Alternatively, the mobile terminal 2 may access the Internet 8 via a wireless connection, such as a cellular provider network (CPN) 18, or a wireless access point (WAP) 20 such as Bluetooth, 802.11b, or HomeRF. In yet another configuration, the mobile terminal 2 may access the Internet through a remote computer 22 connected to the Internet. In each of these configurations all of the synchronization data is routed through the target computer 4, creating a bottleneck that can significantly extend the synchronization session. This is undesirable because it increases the access latency to the synchronized data, and for a remote connection (e.g., a wireless connection), it can increase the connection fees and decreases the battery life of the mobile terminal 2. Further, some of the synchronization data may be private data and inaccessible through a public communication channel via the target computer 4. A user may synchronize the mobile terminal over more than one communication channel (e.g., a public communication channel and a private communication channel), but this requires manually configuring the mobile terminal to perform multiple synchronization sessions over the various communication channels.

There is, therefore, a need to improve upon the current processes for synchronizing a mobile terminal to synchronization data, such as web sites, emails, and PIM data.

SUMMARY OF THE INVENTION

The present invention may be regarded as a method of operating a mobile terminal during a synchronization session. A plurality of data types, including a first data type and a second data type, are identified to synchronize with the mobile terminal. A first communication channel and a second communication channel are identified, and a rule base is applied to assign the first data type to the first communication channel and the second data type to the second communication channel. Synchronization data of the first data type is exchanged over the first communication channel, and synchronization data of the second data type is exchanged over the second communication channel.

In one embodiment the first data type identifies public data and the second data type identifies private data. In another embodiment, the first data type identifies data having a first size, and the second data type identifies data having a second size smaller than the first size.

In one embodiment, the first communication channel having a first bandwidth, and the second communication channel having a second bandwidth less than the first bandwidth. In yet another embodiment, the first communication channel having a first connection cost, and the second data communication channel having a second connection cost less than the first bandwidth. In one embodiment the first communication channel comprises a short-range wireless access point, and the second communication channel comprises a long-range cellular provider network.

In yet another embodiment, synchronization data is exchanged over the first communication channel substantially concurrent with exchanging synchronization data over the second communication channel.

In still another embodiment, the mobile terminal for communicating with a first target computer over the first communication channel and for communicating with a second target computer over the second communication channel, wherein the mobile terminal transmits an identifier to the first target computer for identifying the second target computer.

The present invention may also be regarded as a method of operating a mobile terminal during a synchronization session, wherein the mobile terminal for communicating with at least one target computer, the target computer for applying a rule base for assigning a first data type to a first communication channel and a second data type to a second communication channel. The method comprises the steps of identifying the first communication channel and the second communication channel, and exchanging synchronization data of the first data type over the first communication channel and exchanging synchronization data of the second data type over the second communication channel.

The present invention may also be regarded as a method of operating a first target computer to synchronize a mobile terminal over a first communication channel and over a second communication channel during a synchronization session, the mobile terminal for identifying the first communication channel and the second communication channel. The method comprises the steps of identifying a plurality of data types, including a first data type and a second data type, to synchronize with the mobile terminal, and applying a rule base to assign the first data type to the first communication channel and the second data type to the second communication channel.

The present invention may also be regarded as a mobile terminal comprising a screen, a local memory, and a terminal controller. The terminal controller for synchronizing the mobile terminal during a synchronization session. The terminal controller identifies a plurality of data types, including a first data type and a second data type, to synchronize with the mobile terminal. The terminal controller also identifies a first communication channel and a second communication channel. The terminal controller applies a rule base to assign the first data type to the first communication channel and the second data type to the second communication channel, and exchanges synchronization data of the first data type over the first communication channel and exchanges synchronization data of the second data type over the second communication channel.

The present invention may also be regarded as a mobile terminal for communicating with at least one target computer, the target computer for applying a rule base for assigning a first data type to a first communication channel and a second data type to a second communication channel. The mobile terminal comprises a screen, a local memory, and a terminal controller for synchronizing the mobile terminal during a synchronization session. The terminal controller identifies the first communication channel and the second communication channel, and exchanges synchronization data of the first data type over the first communication channel and exchanges synchronization data of the second data type over the second communication channel.

The present invention may also be regarded as a target computer for synchronizing a mobile terminal over a first communication channel and over a second communication channel during a synchronization session, the mobile terminal for identifying the first communication channel and the second communication channel. The target computer comprise a local memory and a controller for identifying a plurality of data types, including a first data type and a second data type, to synchronize with the mobile terminal and applying a rule base to assign the first data type to the first communication channel and the second data type to the second communication channel.

The present invention may also be regarded as a computer program embodied on a computer readable storage medium for use in a mobile terminal, the computer program for synchronizing the mobile terminal during a synchronization session. The computer program comprises a code segment for identifying a plurality of data types, including a first data type and a second data type, to synchronize with the mobile terminal. The computer program further comprises a code segment for identifying a first communication channel and a second communication channel. The computer program further comprises code segments for applying a rule base to assign the first data type to the first communication channel and the second data type to the second communication channel, and exchanging synchronization data of the first data type over the first communication channel and exchanging synchronization data of the second data type over the second communication channel.

The present invention may also be regarded as a computer program embodied on a computer readable storage medium for use in a mobile terminal, the computer program for synchronizing the mobile terminal during a synchronization session. The mobile terminal for communicating with at least one target computer, the target computer for applying a rule base for assigning a first data type to a first communication channel and a second data type to a second communication channel. The computer program comprises code segments for identifying the first communication channel and the second communication channel, and exchanging synchronization data of the first data type over the first communication channel and exchanging synchronization data of the second data type over the second communication channel.

The present invention may also be regarded as a computer program embodied on a computer readable storage medium for use in a target computer. The target computer for synchronizing a mobile terminal over a first communication channel and over a second communication channel during a synchronization session, the mobile terminal for identifying the first communication channel and the second communication channel. The computer program comprises code segments for identifying a plurality of data types, including a first data type and a second data type, to synchronize with the mobile terminal, and applying a rule base to assign the first data type to the first communication channel and the second data type to the second communication channel.

DESCRIPTION OF THE PREFERRED EMBODIMENTS

Figure 4:
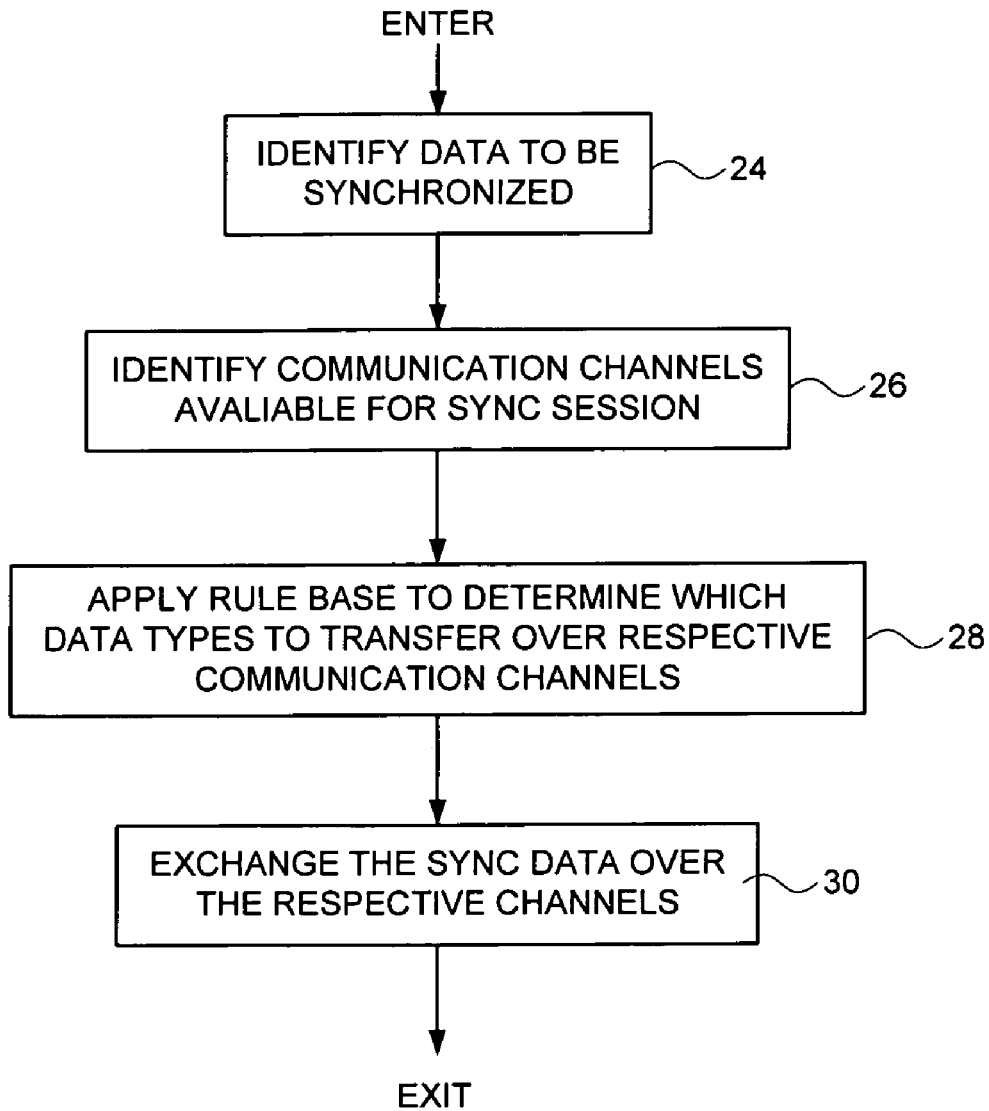
FIG. 4 is a flow chart according to an embodiment of the present invention illustrating the steps executed to synchronize a mobile terminal over multiple communication channels based on data type.

FIG. 4 is a flow chart according to an embodiment of the present invention illustrating the steps executed to synchronize a mobile terminal over multiple communication channels during a synchronization session. At step 24 a plurality of data types, including a first data type and a second data type, are identified to synchronize with the mobile terminal. At step 26 a first communication channel and a second communication channel are identified for use in synchronizing the mobile terminal. At step 28 a rule base is applied to assign the first data type to the first communication channel and the second data type to the second communication channel. At step 30 synchronization data of the first data type is exchanged over the first communication channel and synchronization data of the second data type is exchanged over the second communication channel.

Figure 1:
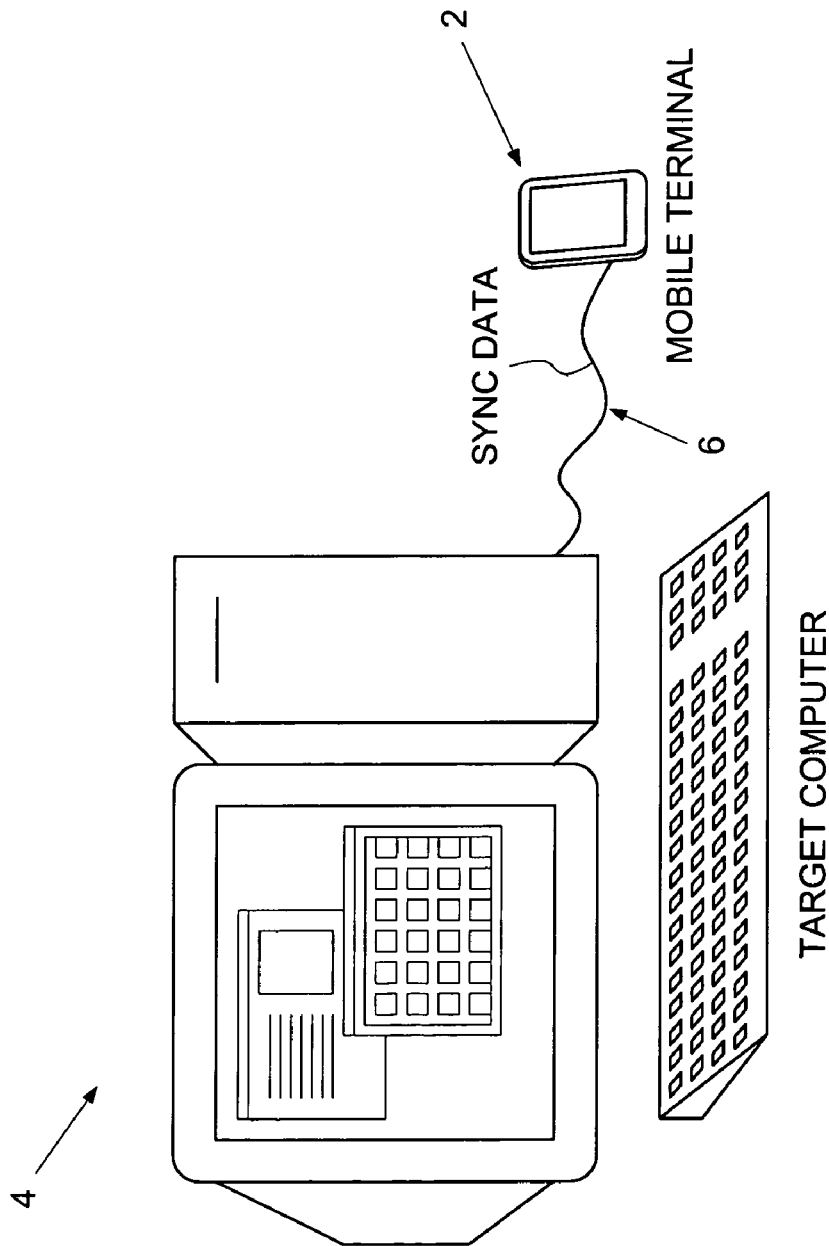
FIG. 1 shows a prior art configuration wherein a mobile terminal is synchronized to a target computer over a direct wired connection.
Figure 2:
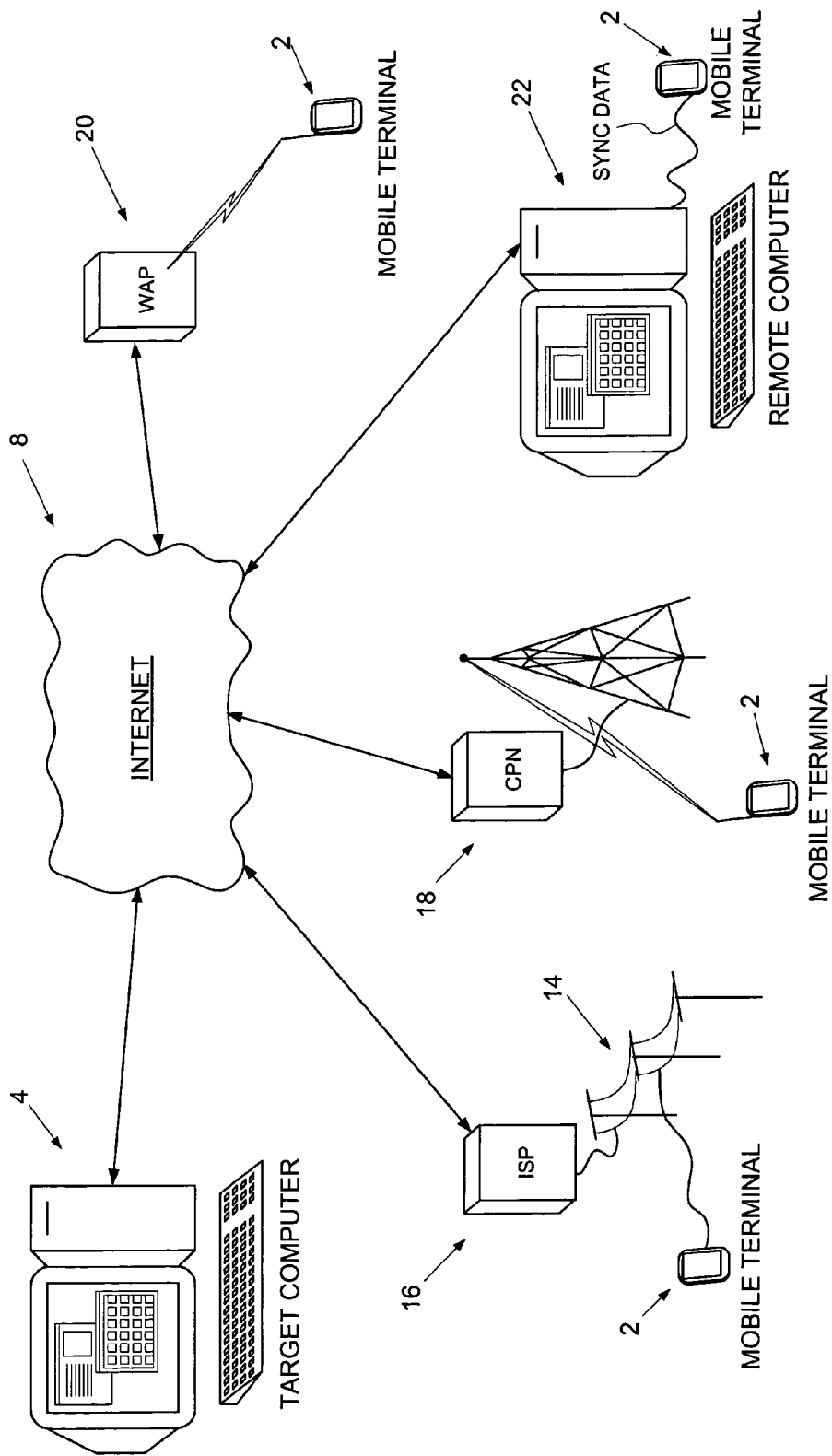
FIG. 2 shows a prior art configuration wherein a mobile terminal is synchronized remotely to the target computer over a wired connection (e.g., telephone land lines) or over a wireless network via the Internet.
Figure 3:
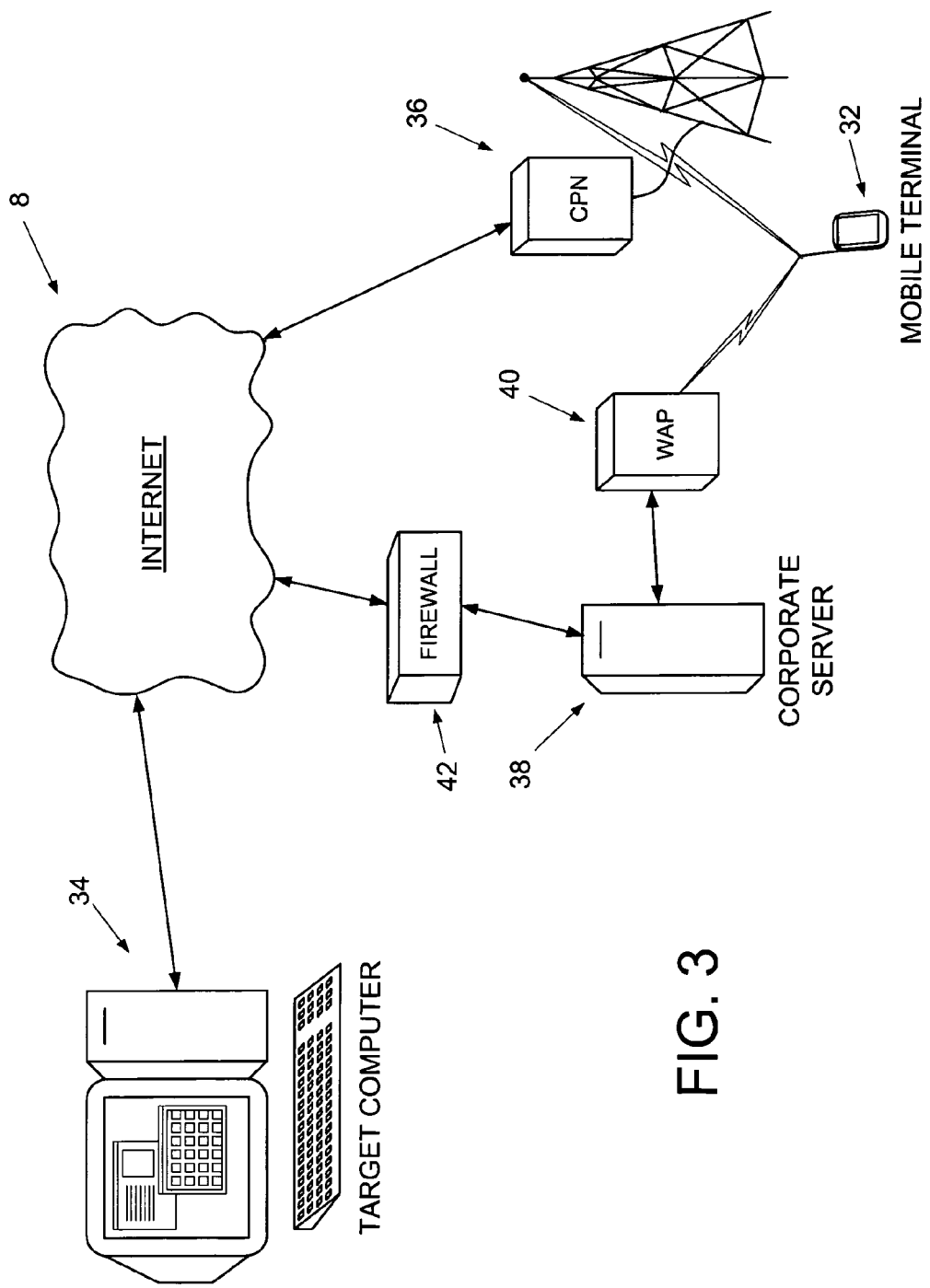
FIG. 3 shows a configuration according to an embodiment of the present invention for synchronizing a mobile terminal over multiple communication channels based on data type.

FIG. 3 shows a configuration illustrating an embodiment of the present invention. A mobile terminal 32 is synchronized to a target computer 34 over the Internet 8 over a first communication channel comprising a CPN 36, and synchronized to a corporate server 38 over a second communication channel comprising a WAP 40. The corporate server 38 is connected to the Internet 8 through a firewall 42 which prevents selected data from passing through the corporate network. For example, the user of the mobile terminal 32 may want to synchronize to PIM data and personal emails stored on the target computer 34. However, this data is not accessible through the Internet 8 via the corporate server 38 because it is blocked by the firewall 42. The firewall 42 may block this data for various reasons, such as security concerns or the desire to restrict corporate bandwidth to corporate data. The user of the mobile terminal 32 may also want to synchronize to PIM data and business emails stored on the corporate server 38. The mobile terminal 32 evaluates the various types of data to be synchronized together with the communication channels available to perform the synchronization. In the example of FIG. 3, the mobile terminal 32 identifies the WAP 40 communication channel for synchronizing to data stored on the corporate server 38, and the CPN 36 communication channel for synchronizing to data stored on the target computer 34.

In one embodiment, the synchronization data comprises public data and private data. Referring again to FIG. 3, the data stored on the corporate server 38 may be private data accessible only by authorized users. Therefore, the mobile terminal 32 selects a private communication channel, such as a private WAP 40 or an encrypted communication channel, to synchronize to the private data stored on the corporate server 38. Other data, such as selected pages from web sites, may be public data accessible by anyone. Therefore, the mobile terminal 32 selects a public channel, such as a public CPN 36 or other unencrypted channel for accessing the Internet 8, to synchronize to the public data.

In another embodiment, the synchronization data comprises data types of varying size, and the mobile terminal 32 selects the appropriate communication channel relative to quality of service issues, such as cost and bandwidth. For example, it may be desirable to transmit large data types, such as images or email attachments, over a wired communication channel having a high bandwidth and low connection cost. Smaller data types, such as the text of an email or a web page, may be transmitted over a lower bandwidth communication channel having a higher connection cost, such as a CPN. Referring again to FIG. 3, large data types may be transmitted via the short-range WAP 40 and corporate server 38 whereas smaller data types may be transmitted over the long-range CPN 36 via the Internet 8.

Any suitable communication channel may be used to synchronize the mobile terminal 32, including a wired or wireless modem, Ethernet, CPN, or a WAP such as Bluetooth, 802.11b, or HomeRF. The mobile terminal 32 may select two or more of the available communication channels for synchronizing based on data type.

In one embodiment, the mobile terminal exchanges synchronization data over a first communication channel substantially concurrent with exchanging synchronization data over a second communication channel. Referring again to FIG. 3, the mobile terminal 32 may exchange synchronization data with the corporate server 38 via the WAP 40 while concurrently exchanging synchronization data with the target computer 34 via the CPN 36 and Internet 8. This embodiment may expedite the synchronization session as well as conserve battery power.

In one embodiment, the mobile terminal 32 executes the step of applying the rule base to assign the first data type to the first communication channel and the second data type to the second communication channel. In an alternative embodiment, the step of applying the rule base is executed by a target computer used to synchronize the mobile terminal 32. Referring again to FIG. 3, the corporate server 38 may apply the rule base to assign a first data type to the WAP channel 38 and a second data type to the CPN channel 36. In this embodiment, the mobile terminal 32 identifies the communication channels available for use during the synchronization session, and transmits a list of the available communication channels to the target computer (e.g., to the corporate server 38).

In one embodiment, the mobile terminal 32 communicates with a first target computer over the first communication channel, and with a second target computer over the second communication channel. The first and second target computers communicate with one another to configure the synchronization session. Referring again to FIG. 3, the corporate server 38 may communicate with the target computer 34 to configure the synchronization session so that corporate data and data that can pass through the firewall 42 is synchronized over the WAP channel 40, and all other data is synchronized over the CPN channel 36. In one embodiment the mobile terminal 32 transmits an identifier to the first target computer (e.g., the corporate server 38), wherein the identifier identifies the second target computer (e.g., target computer 34). In this manner the first target computer can locate and communicate with the second target computer (e.g., over the Internet 8). Further details of this embodiment are disclosed in U.S. patent application Ser. No. 09/919,066, filed Jul. 30, 2001, entitled "MULTI-SITED DISTRIBUTED SYNCHRONIZATION OF A MOBILE TERMINAL", which is incorporated herein by reference in its entirety.

In one embodiment, the first data type comprises a first component of a document, and the second data type comprises a second component of a document. Further details of this embodiment are disclosed in U.S. patent application Ser. No. 09/918,666, filed Jul. 30, 2001, entitled "MOBILE TERMINAL SYNCHRONIZING COMPONENTS OF A DOCUMENT OVER MULTIPLE COMMUNICATION CHANNELS", which is incorporated herein by reference in its entirety.

Figure 5A:
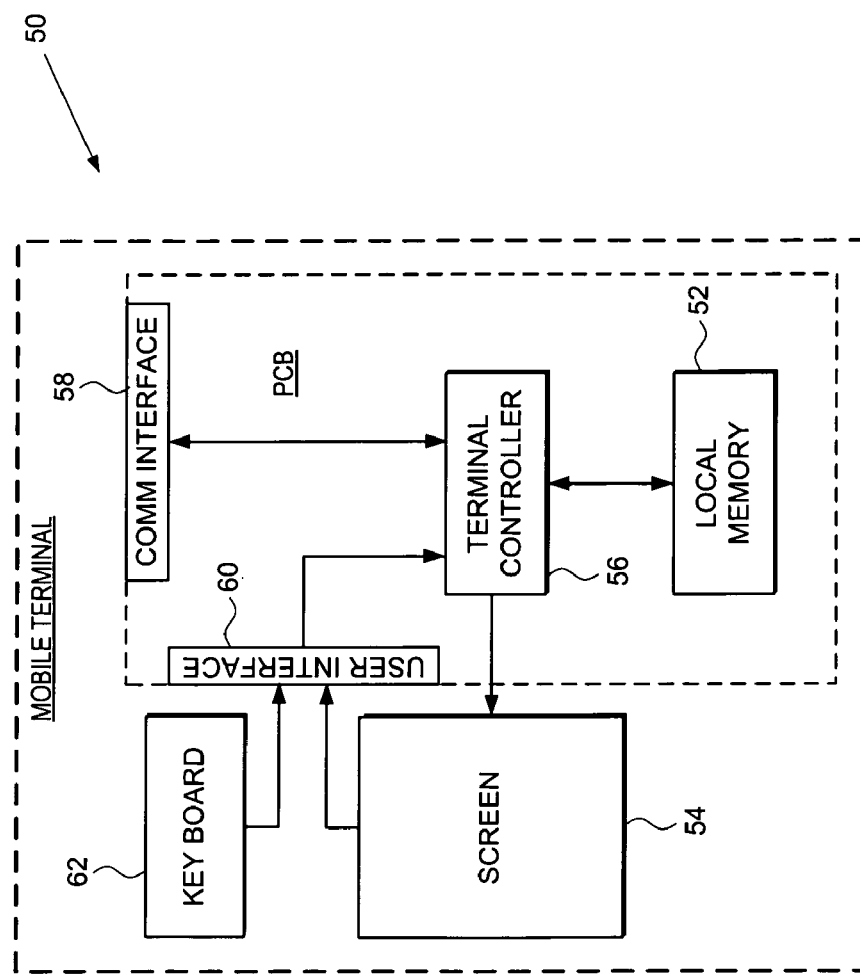
FIG. 5A shows a mobile terminal according to an embodiment of the present invention comprising a terminal controller for exchanging various types of synchronization data over respective communication channels.

FIG. 5A shows a mobile terminal 50 for synchronizing various data types over respective communication channels according to an embodiment of the present invention. The mobile terminal 50 comprises a local memory 52 for storing synchronization data, a screen 54, and a terminal controller 56. At the beginning of a synchronization session, the terminal controller 56 identifies a plurality of data types, including a first data type and a second data type, to synchronize with the mobile terminal 50. The terminal controller 56 identifies a first communication channel and a second communication channel, and applies a rule base to assign the first data type to the first communication channel and the second data type to the second communication channel. The terminal controller 56 then exchanges synchronization data of the first data type over the first communication channel and exchanges synchronization data of the second data type over the second communication channel. In the embodiment of FIG. 5A, the mobile terminal 50 further comprises a communication interface 58 for exchanging the synchronization data over the first and second communication channels, and a user interface 60 for receiving user input from a key board 62 as well as the screen 54.

Figure 5B:
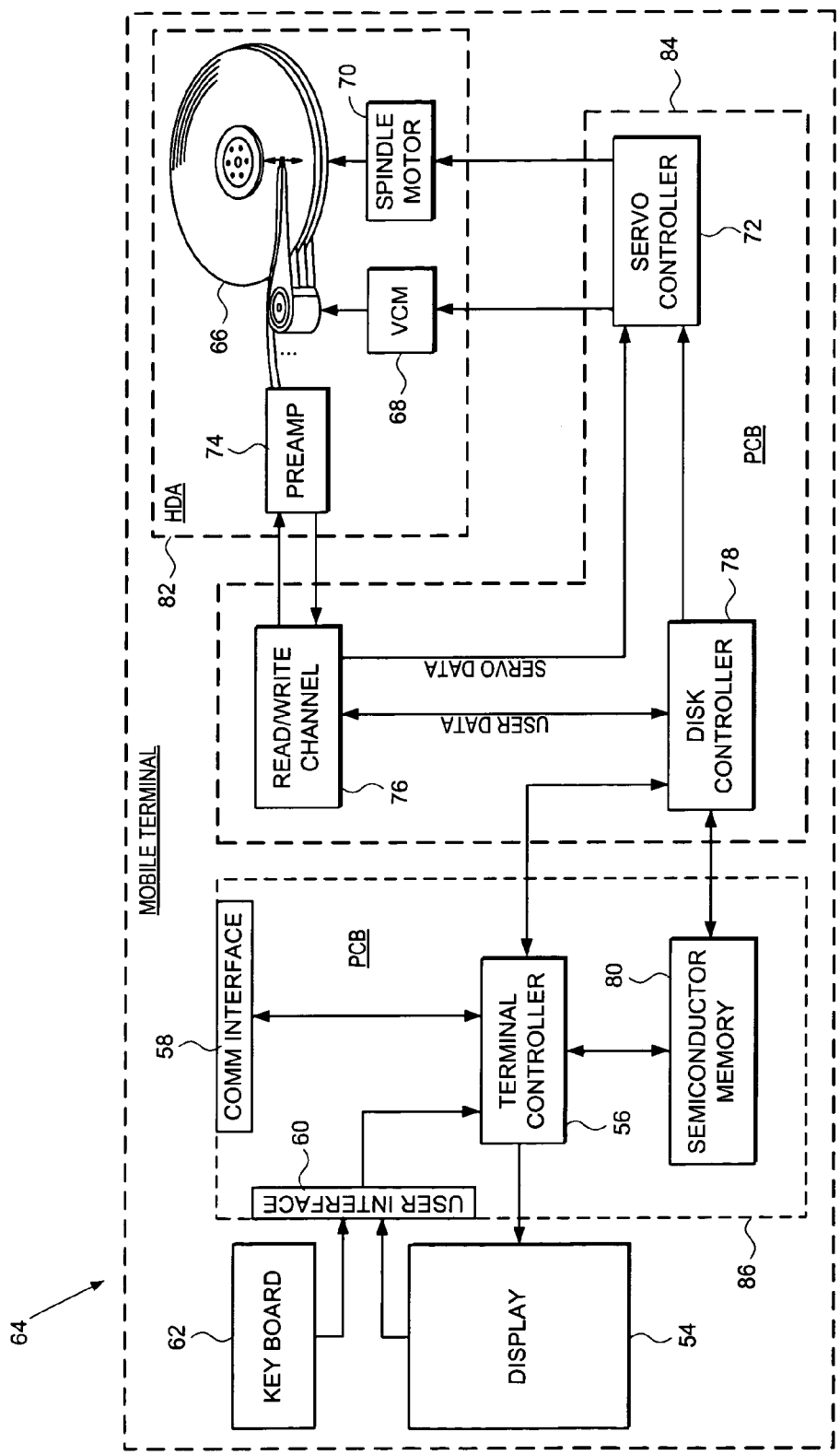
FIG. 5B shows a mobile terminal according to an embodiment of the present invention comprising a disk for nonvolatile storage of the synchronization data.

FIG. 5B shows a mobile terminal 64 according to an embodiment of the present invention wherein the local memory comprises a disk 66. The mobile terminal 64 further comprises components for enabling the disk storage, including a voice coil motor (VCM) 68 and spindle motor 70, a servo controller 72, a preamp 74, a read/write channel 76, and a disk controller 78. In the embodiment of FIG. 5B, the mobile terminal 64 comprises semiconductor memory 80 that is shared by the terminal controller 56 and disk controller 78 to reduce the cost of the mobile terminal 64. In another embodiment, the terminal controller 56 executes a disk caching algorithm for caching data read from and written to the disk 66. In the embodiment of FIG. 5B, the disk 66, VCM 68, spindle motor 70 and preamp 74 are implemented within a head disk assembly (HDA) 82, the servo controller 72, read/write channel 76 and disk controller 78 are implemented on a first printed circuit board (PCB) 84, and the terminal controller 56 and semiconductor memory 80 are implemented on a second PCB 86. In an alternative embodiment, the servo controller 72, read/write channel 76, disk controller 78, terminal controller 56, and semiconductor memory 80 are implemented on a single PCB.

In one embodiment, the local memory of the mobile terminal (e.g., the disk 66 in FIG. 5B) stores a computer program comprising a code segment for identifying a plurality of data types, including a first data type and a second data type, to synchronize with the mobile terminal. The computer program further comprises code segments for identifying a first communication channel and a second communication channel, and for applying a rule base to assign the first data type to the first communication channel and the second data type to the second communication channel. The computer program further comprises a code segment for exchanging synchronization data of the first data type over the first communication channel and exchanging synchronization data of the second data type over the second communication channel.

We claim:

1. A method of operating a mobile terminal during a synchronization session, the method comprising the steps of:
    (a) identifying a plurality of data types, including a first data type and a second data type;
    (b) identifying a first communication channel and a second communication channel;
    (c) applying a rule base to assign the first data type to the first communication channel and the second data type to the second communication channel; and
    (d) receiving data of the first data type over the first communication channel and receiving data of the second data type over the second communication channel;
wherein the mobile terminal is operable to communicate with a first target computer over the first communication channel and with a second target computer over the second communication channel, further comprising the step of transmitting an identifier to the first target computer for identifying the second target computer.

2. The method as recited in claim 1, wherein the first communication channel comprises an unencrypted communication channel and the second communication channel comprises an encrypted communication channel.

3. The method as recited in claim 1, wherein:
    (a) the first data type identifies data having a first size; and
    (b) the second data type identifies data having a second size smaller than the first size.

4. The method as recited in claim 3, wherein:
    (a) the first communication channel has a first bandwidth; and
    (b) the second communication channel has a second bandwidth less than the first bandwidth.

5. The method as recited in claim 1, wherein:
    (a) the first communication channel has a first connection cost; and
    (b) the second communication channel has a second connection cost less than the first cost.

6. The method as recited in claim 1, wherein:
    (a) the first communication channel comprises a long-range cellular provider network; and
    (b) the second communication channel comprises a short-range wireless access point.

7. The method as recited in claim 1, wherein the step of receiving data over the first communication channel is substantially concurrent with the step of receiving data over the second communication channel.

8. The method as recited in claim 1, wherein the short-range wireless access point comprises a Bluetooth connection.

9. The method as recited in claim 1, wherein the short-range wireless access point comprises an 802.11b connection.

10. The method as recited in claim 1, wherein the short-range wireless access point comprises a HomeRF connection.

11. A method of operating a mobile terminal during a synchronization session, the mobile terminal for communicating with at least one target computer, the target computer for applying a rule base for assigning a first data type to a first communication channel and a second data type to a second communication channel, the method of operating the mobile terminal comprising the steps of:
    (a) identifying the first communication channel and the second communication channel; and
    (b) receiving data of the first data type over the first communication channel and receiving data of the second data type over the second communication channel;
wherein the mobile terminal is operable to communicate with a first target computer over the first communication channel and with a second target computer over the second communication channel, further comprising the step of transmitting an identifier to the first target computer for identifying the second target computer.

12. The method as recited in claim 11, wherein the first communication channel comprises an unencrypted communication channel and the second communication channel comprises an encrypted communication channel.

13. The method as recited in claim 11, wherein:
    (a) the first data type identifies data having a first size; and
    (b) the second data type identifies data having a second size smaller than the first size.

14. The method as recited in claim 13, wherein:
    (a) the first communication channel has a first bandwidth; and
    (b) the second communication channel has a second bandwidth less than the first bandwidth.

15. The method as recited in claim 11, wherein:
    (a) the first communication channel has a first connection cost; and
    (b) the second communication channel has a second connection cost less than the first cost.

16. The method as recited in claim 11, wherein:
    (a) the first communication channel comprises a long-range cellular provider network; and
    (b) the second communication channel comprises a short-range wireless access point.

17. The method as recited in claim 11, wherein the step of receiving data over the first communication channel is substantially concurrent with the step of receiving data over the second communication channel.

18. A method of operating a first target computer to synchronize a mobile terminal over a first communication channel and over a second communication channel during a synchronization session, the mobile terminal for identifying the first communication channel and the second communication channel, the method of operating the first target computer comprising the steps of:
    identifying a plurality of data types, including a first data type and a second data type;
    applying a rule base to assign the first data type to the first communication channel and the second data type to the second communication channel;
    receiving from the mobile terminal an identifier identifying a second target computer available for synchronizing the mobile terminal;
    transmitting data to the mobile terminal over the first communication channel; and
    configuring the second target computer to transmit data to the mobile terminal over the second communication channel.

19. The method as recited in claim 18, wherein the first communication channel comprises an unencrypted communication channel and the second communication channel comprises an encrypted communication channel.

20. The method as recited in claim 18, wherein:
(a) the first data type identifies data having a first size; and
(b) the second data type identifies data having a second size smaller than the first size.

21. The method as recited in claim 20, wherein:
(a) the first communication channel has a first bandwidth; and
(b) the second communication channel has a second bandwidth less than the first bandwidth.

22. The method as recited in claim 18, wherein:
(a) the first communication channel has a first connection cost; and
(b) the second communication channel has a second connection cost less than the first cost.

23. The method as recited in claim 18, wherein:
(a) the first communication channel comprises a long-range cellular provider network; and
(b) the second communication channel comprises a short-range wireless access point.

24. The method as recited in claim 18, wherein data is transmitted over the first communication channel substantially concurrent with data over the second communication channel.

25. A mobile terminal comprising:
(a) a screen;
(b) a local memory; and
(c) a terminal controller operable to:
identify a plurality of data types, including a first data type and a second data type;
identify a first communication channel and a second communication channel;
apply a rule base to assign the first data type to the first communication channel and the second data type to the second communication channel;
receive data of the first data type over the first communication channel and receive data of the second data type over the second communication channel;
communicate with a first target computer over the first communication channel and with a second target computer over the second communication channel; and
transmit an identifier to the first target computer for identifying the second target computer.

26. The mobile terminal as recited in claim 25, wherein the first communication channel comprises an unencrypted communication channel and the second communication channel comprises an encrypted communication channel.

27. The mobile terminal as recited in claim 25, wherein:
(a) the first data type identifies data having a first size; and
(b) the second data type identifies data having a second size smaller than the first size.

28. The mobile terminal as recited in claim 27, wherein:
(a) the first communication channel has a first bandwidth; and
(b) the second communication channel has a second bandwidth less than the first bandwidth.

29. The mobile terminal as recited in claim 25, wherein:
(a) the first communication channel has a first connection cost; and
(b) the second communication channel has a second connection cost less than the first cost.

30. The mobile terminal as recited in claim 25, wherein:
(a) the first communication channel comprises a long-range cellular provider network; and
(b) the second communication channel comprises a short-range wireless access point.

31. The mobile terminal as recited in claim 25, wherein data is received over the first communication channel substantially concurrent with data over the second communication channel.

32. A mobile terminal for communicating with a first target computer, the first target computer for applying a rule base for assigning a first data type to a first communication channel and a second data type to a second communication channel, the mobile terminal comprising:
(a) a screen;
(b) a local memory; and
(c) a terminal controller operable to:
identify the first communication channel and the second communication channel;
receive data of the first data type over the first communication channel and receive data of the second data type over the second communication channel;
communicate with the first target computer over the first communication channel and with a second target computer over the second communication channel; and
transmit an identifier to the first target computer for identifying the second target computer.

33. The mobile terminal as recited in claim 32, wherein the first communication channel comprises an unencrypted communication channel and the second communication channel comprises an encrypted communication channel.

34. The mobile terminal as recited in claim 32, wherein:
(a) the first data type identifies data having a first size; and
(b) the second data type identifies data having a second size smaller than the first size.

35. The mobile terminal as recited in claim 34, wherein:
(a) the first communication channel has a first bandwidth; and
(b) the second communication channel has a second bandwidth less than the first bandwidth.

36. The mobile terminal as recited in claim 32, wherein:
(a) the first communication channel has a first connection cost; and
(b) the second communication channel has a second connection cost less than the first cost.

37. The mobile terminal as recited in claim 32, wherein:
(a) the first communication channel comprises a long-range cellular provider network; and
(b) the second communication channel comprises a short-range wireless access point.

38. The mobile terminal as recited in claim 32, wherein the data is received over the first communication channel substantially concurrent with data over the second communication channel.

39. A first target computer for synchronizing a mobile terminal over a first communication channel and over a second communication channel during a synchronization session, the mobile terminal for identifying the first communication channel and the second communication channel, the first target computer comprising:
(a) a local memory; and
(b) a controller operable to:
identify a plurality of data types, including a first data type and a second data type; and apply a rule base to assign the first data type to the first communication channel and the second data type to the second communication channel;

receive from the mobile terminal an identifier identifying a second target computer available for synchronizing the mobile terminal;

transmit data to the mobile terminal over the first communication channel; and configure the second target computer to transmit data to the mobile terminal over the second communication channel.

40. The first target computer as recited in claim 39, wherein the first communication channel comprises an unencrypted communication channel and the second communication channel comprises an encrypted communication channel.

41. The first target computer as recited in claim 39, wherein:
(a) the first data type identifies data having a first size; and
(b) the second data type identifies data having a second size smaller than the first size.

42. The first target computer as recited in claim 41, wherein:
(a) the first communication channel has a first bandwidth; and
(b) the second communication channel has a second bandwidth less than the first bandwidth.

43. The first target computer as recited in claim 39, wherein:
(a) the first communication channel has a first connection cost; and
(b) the second communication channel has a second connection cost less than the first cost.

44. The first target computer as recited in claim 39, wherein:
(a) the first communication channel comprises a long-range cellular provider network; and
(b) the second communication channel comprises a short-range wireless access point.

45. The first target computer as recited in claim 39, wherein data is transmitted over the first communication channel substantially concurrent with data over the second communication channel.

46. A computer program embodied on a computer readable storage medium for use in a first target computer, the first target computer for synchronizing a mobile terminal over a first communication channel and over a second communication channel during a synchronization session, the mobile terminal for identifying the first communication channel and the second communication channel, the computer program comprising code segments for:

identifying a plurality of data types, including a first data type and a second data type; and applying a rule base to assign the first data type to the first communication channel and the second data type to the second communication channel;

receiving from the mobile terminal an identifier identifying a second target computer available for synchronizing the mobile terminal;

transmitting data to the mobile terminal over the first communication channel; and configuring the second target computer to transmit data to the mobile terminal over the second communication channel.

47. A computer program embodied on a computer readable storage medium for use in a mobile terminal, the computer program for synchronizing the mobile terminal during a synchronization session, the computer program comprising code segments to perform the method comprising:

identifying a plurality of data types, including a first data type and a second data type;

identifying a first communication channel and a second communication channel;

applying a rule base to assign the first data type to the first communication channel and the second data type to the second communication channel; and receiving data of the first data type over the first communication channel and receiving data of the second data type over the second communication channel;

communicating with a first target computer over the first communication channel and with a second target computer over the second communication channel; and transmitting an identifier to the first target computer for identifying the second target computer.

48. A computer program embodied on a computer readable storage medium for use in a mobile terminal, the computer program for synchronizing the mobile terminal during a synchronization session, the mobile terminal for communicating with a first target computer, the first target computer for applying a rule base for assigning a first data type to a first communication channel and a second data type to a second communication channel, the computer program comprising code segments to perform the method comprising:

identifying the first communication channel and the second communication channel; and receiving data of the first data type over the first communication channel and receiving data of the second data type over the second communication channel;

communicating with the first target computer over the first communication channel and with a second target computer over the second communication channel; and transmitting an identifier to the first target computer for identifying the second target computer.

* * * * *